J. R. GAMMETER.
VALVE.
APPLICATION FILED FEB. 8, 1918.

1,278,133.

Patented Sept. 10, 1918.
2 SHEETS—SHEET 1.

INVENTOR.
John R. Gammeter
BY
Robert M. Pierson
ATTORNEY

J. R. GAMMETER.
VALVE.
APPLICATION FILED FEB. 8, 1918.
1,278,133.
Patented Sept. 10, 1918.
2 SHEETS—SHEET 2.
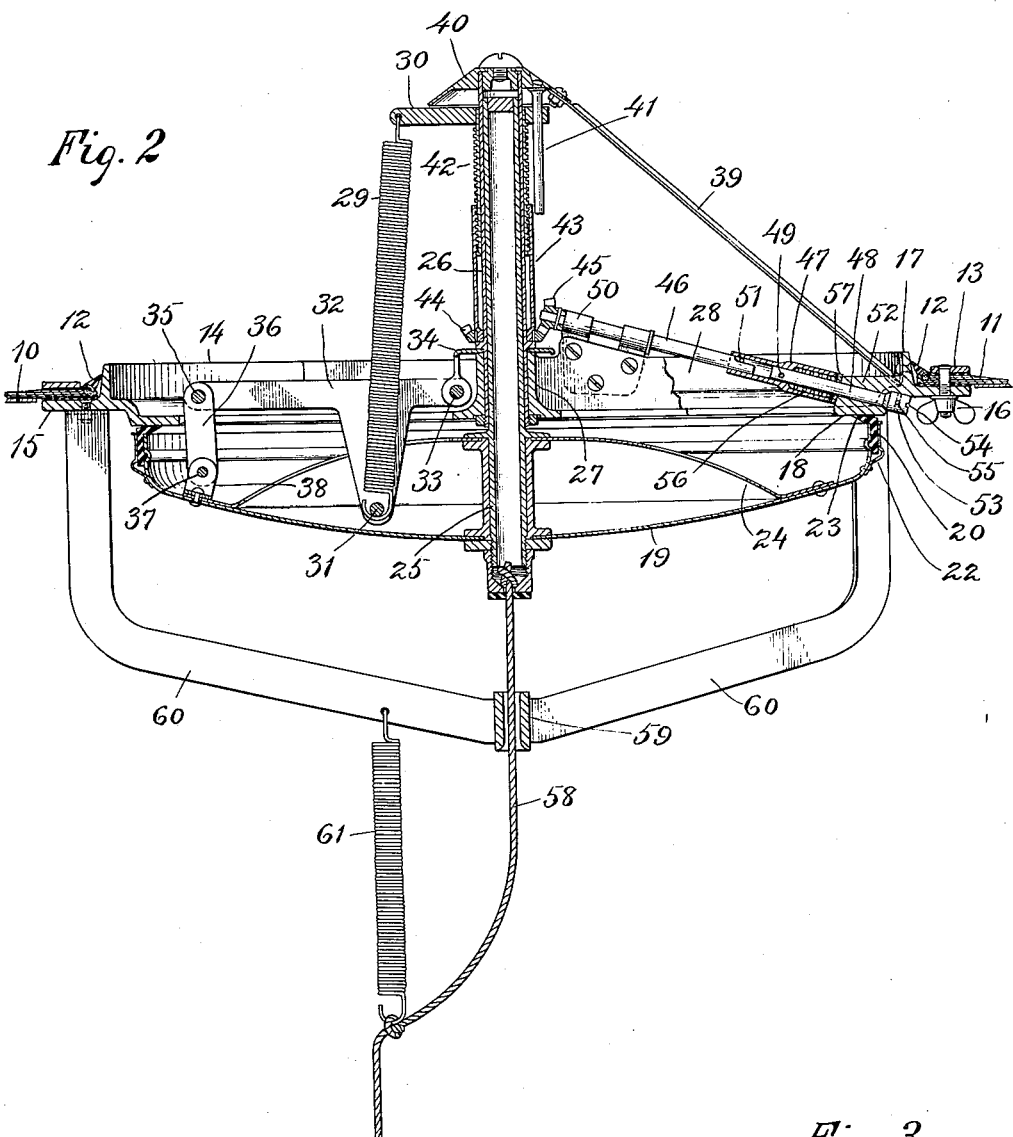
Fig. 2
Fig. 3
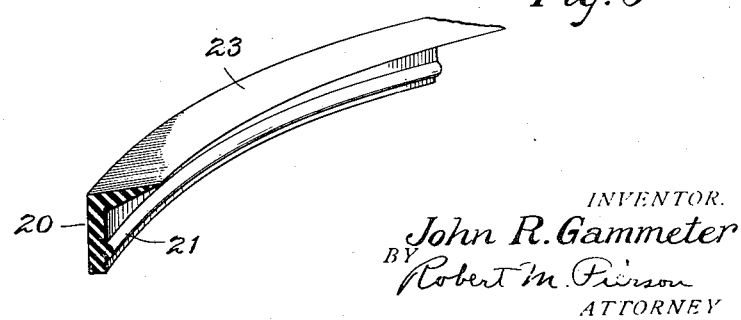
INVENTOR.
John R. Gammeter
BY Robert M. Pierson
ATTORNEY

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

VALVE.

1,278,133.           Specification of Letters Patent.     Patented Sept. 10, 1918.

Application filed February 8, 1918. Serial No. 215,965.

*To all whom it may concern:*

Be it known that I, JOHN R. GAMMETER, a citizen of the United States, residing at Akron, in the county of Summit and State of Ohio, have invented a certain new and useful Valve, of which the following is a specification.

This invention relates to valves, and especially relief valves of the automatic fluid-operated type controlling the outlet of a pressure vessel or conduit, and adapted to open upon the attainment of a predetermined pressure therein. The herein-described embodiment of my invention has been designed especially for balloons. While valves of the class mentioned are well known, it has been my particular object in this connection to devise a valve of great delicacy of operation which will remain tightly seated until the pressure at which it has been set to open has been attained, and will then open rather widely so as to permit a free discharge of gas from the balloon until pressure equilibrium has been restored. Further objects are to so mount the valve frame in the wall or envelop of the balloon as to avoid leakage around said frame and also permit the valve and frame to be readily applied and removed as a unit, and to provide improved means for adjusting from the outside the tension of the valve-seating spring or springs.

Of the accompanying drawings,

Fig. 2 is a vertical section showing the valve unit assembled with the envelop, but omitting the upper and lower shields or guards.

Fig. 3 is a sectional perspective view, on a larger scale, showing a part of the valve packing ring.

Figure 1:
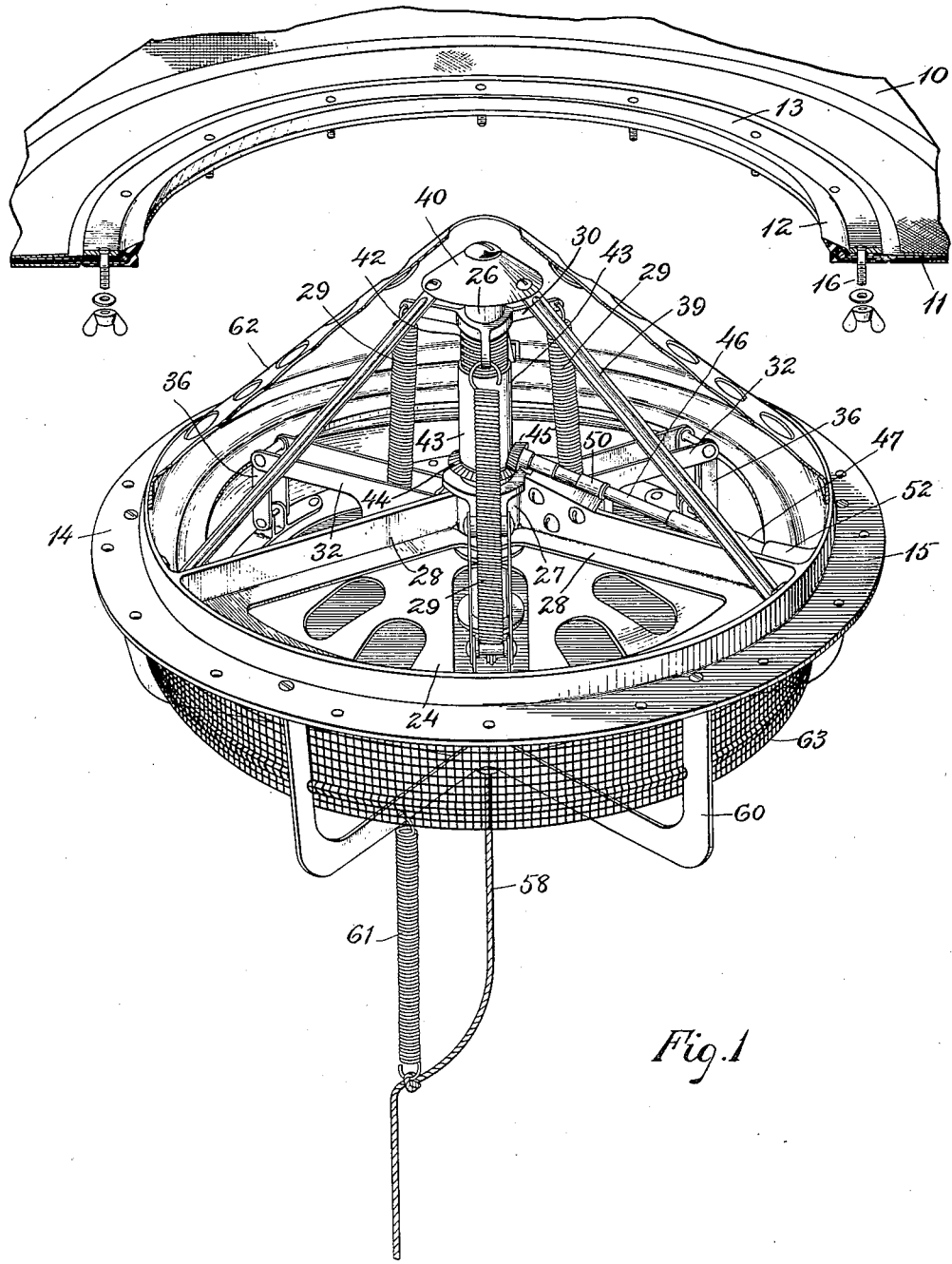
Figure 1 is a perspective view, partly in section, of a portion of a balloon envelop and valve assembly embodying my improvements, showing the valve unit detached from the envelop.

In the drawings, 10 is the balloon envelop having a circular opening bordered by a laminated, rubberized, fabric ring 11, whose inner margin is formed with a vulcanized soft-rubber packing flange or lip 12 having an inward slant when viewed in cross-section, this fabric ring being overlaid by a metal ring 13 close to the packing flange. 14 is the metallic valve frame having an outwardly-extending horizontal or transverse flange 15 attached by wing-nut bolts 16 to the rings 11 and 13, underneath the former, and an externally-tapered vertical or axial flange 17 telescoping with the rubber packing flange 12, the internal pressure tending to crowd these two parts together and maintain a pressure-tight joint, which may nevertheless be readily disconnected and the entire valve unit removed by disengaging the bolts 16 and withdrawing the frame and its valve.

18 is an annular, horizontal or transverse flat valve-seat formed on the frame 14, and 19 is a shallow cup-shaped valve of the disk type movable toward and from said seat to control the outlet passage through the frame 14. One of the important features of my invention is an annular packing ring 20 which I prefer to form of vulcanized soft rubber substantially L-shaped in cross-section and consisting of a beaded, tubular, attaching portion 21 which is clamped between double walls forming the edge portion 22 of the valve body, and an internal flexible lip or flange portion 23 projecting inwardly or transversely toward the center at a slight upward inclination with reference to the valve-seat, this lip tapering to a relatively-thin inner edge which rests against said seat in the closed position of the valve. This flexible lip is exposed to the gas pressure within the balloon envelop 10 and will maintain the closure of the outlet therefrom by remaining in contact with the seat 18 through a substantial movement of the valve body away from said seat.

The head of the valve body is internally braced or reinforced with a convex skeleton plate 24, and is provided with a vertical stem 25 which works in a bearing sleeve or bushing 26 on the frame 14, this bushing being mounted in a central hub 27 carried by radial arms 28 forming a part of said frame.

Three helical pull-springs 29 are provided for loading or seating the valve, these springs at their upper ends being hooked to the arms of an adjusting spider 30, and at their lower ends hooked to pins 31 on a series of radial levers 32. The inner ends of said levers are fulcrumed at 33 upon pins carried by a bracket 34 which is secured on top of the bearing hub 27, and at their outer ends are pivoted by means of pins 35 to the upper ends of vertical links 36 whose lower ends are pivoted at 37 to ears 38 on the inner side of the head of the valve-body near the outer margin of the latter. The lower spring connection on the pin 31 of each lever is located a considerable distance below a straight line connecting the pins 33 and 35, so that pin 31, during the opening movement of the valve, while it moves downwardly and increases the tension on the spring 29, travels in a rather flat arc transverse to the line of movement of the valve and the direction of pull or pressure of the spring, the downward movement of said pin being of less extent than that of the valve by reason of the position of said arc and the ratio between the long lever arm 33, 35 and the short arm 33, 31, the consequence being that the spring tension remains very nearly constant throughout the entire opening or closing movement of the valve.

The bearing sleeve 26 is braced by means of diagonal stay rods 39 attached at their upper ends to a cap 40 on the summit of said sleeve and at their lower ends to the peripheral portion of the frame 14. From the cap 40 depends a steady-pin 41 to prevent turning of the spider 30. The latter is attached to the upper end of a hollow screw 42 which slides vertically on the sleeve 26 and is threaded into a nut 43 resting on a shoulder on said sleeve. The lower end of the nut is provided with a bevel gear 44 which meshes with a complemental bevel gear 45 on the inner end of a radial inclined shaft, the latter being composed of two telescopic sections 46, 47 and a third section 48 pinned at 49 to the section 47. The section 46 is journaled in a bearing 50 on one of the frame arms 28, and is prevented from turning with relation to the section 47 by a spline 51. The shaft-section 48 is journaled in a bearing 52 on the periphery of the frame 14 and has an external head 53 with a screw-driver slot 54 and turning-pin holes 55 for rotating the shaft so as to turn the nut 43 and move the screw 42 and spider 30 up or down to adjust the tension of the springs 29. A spring 56, contained in the shaft-section 47 and bearing at its ends respectively against said shaft-section and a soft washer 57, tends to force the head 53 and the washer 57 against opposite ends of the shaft-bearing 52, and thereby preserve a fluid-tight joint around the outer journal of the shaft.

58 is an emergency pull-cord attached to the lower end of the valve stem 25 and passing through a guide 59 supported by arms 60 from the flange 15 of the valve frame, the weight of this cord being sustained by a spring 61.

In Fig. 1 I have shown a conical openwork guard or shield 62 located above, and a woven-wire guard or shield 63 located below the valve, and attached to its frame 14, for protecting the valve parts.

In operating my invention, the gas pressure at which it is desired that the valve 19 shall open in any given atmospheric pressure is determined by adjusting the tension of the springs 29 by means of the exposed shaft-head 53 in the manner already described, the opening of the valve being brought about by an increase of the internal pressure beyond that point, or a decrease in the atmospheric pressure due to the rising of the balloon. This action in principle is well known, for example, in connection with observation balloons, which are commonly provided with gas relief valves and air ballonnets for maintaining their equilibrium. In my described improvement, as the critical pressure is approached, the valve-body moves away from the seat 18, but the valve does not immediately open because the internal pressure keeps the flexible packing lip 23 sealed against said seat. This initial outward movement of the valve is accompanied by only a very slight increase in tension of the springs 29 by reason of their small component of axial stretching motion due to the position of the pins 31 on the levers 32. The valve will therefore open by a very small increase of fluid-pressure beyond the pressure which causes it to start away from its seat. When the flexible lip 23 finally leaves the seat 18 it tends to spring away toward the valve body and a free and rapid outflow of gas from the envelop 10 takes place. The restoration of pressure equilibrium is therefore rapidly accomplished and the valve quickly returns to its closed position and completely seals the outlet.

Various changes of embodiment may be made without departing from the scope of my invention.

I claim:

1. In a valve structure, the combination of fluid-controlling members comprising a valve-seat surrounding a fluid passage, and an automatic valve loaded to close against said seat and adapted to be opened in the direction of flow by the fluid pressure anterior to the valve, one of said members having a flexibly-mounted portion sealed by the anterior fluid pressure and adapted to maintain the closure of said passage during the initial opening movement of the valve.

2. In a valve structure, the combination of a transverse valve-seat surrounding a fluid passage, and an automatic loaded valve adapted to be opened in the direction of flow by the fluid pressure anterior thereto, said valve having an annular, transverse, inwardly-projecting, flexible, free-edged packing lip coacting with said seat and adapted to remain sealed against the latter during the initial opening movement of the valve.

3. In a valve structure, the combination with a fluid-pressure receptacle, of a valve-seat surrounding an outlet passage from said receptacle, and an outwardly-opening, disk-type valve having an internal, transverse, flexible, annular packing member adapted to be held against said seat by the fluid pressure within the receptacle during the initial outward movement of the valve.

4. In a valve structure, the combination with a fluid-pressure receptacle, of a valve seat surrounding an outlet passage from said receptacle, an outwardly-opening, disk-type automatic relief-valve controlling said passage, means yieldingly seating said valve, and an annular, flexible, compensating packing carried by the valve and adapted to be held against said seat by the internal fluid pressure, said packing serving to maintain the outlet passage closed during a substantial outward movement of the valve.

5. In a valve structure, the combination with a fluid container, of an annular metallic frame having a valve seat and an axial inner flange, an annular flexible member included in the wall of said container and having a soft-rubber free marginal lip adapted to be held against said flange by the internal fluid pressure so as to form a pressure-tight joint with said ring, and a valve coöperating with said seat.

6. In a valve structure, the combination with the wall of a pressure receptacle provided with an opening, of a ring carried by said wall and surrounding said opening, a valve frame removably mounted in said opening, an automatic pressure-relief valve carried by said frame, detachable screw fastening devices for securing said frame to the ring, and annular sealing means on said wall telescoping with the valve frame and actuated by the internal fluid pressure for maintaining a fluid-tight joint between said wall and frame.

7. In valve apparatus, the combination of a transverse valve-seat surrounding a fluid passage, an automatic fluid-pressure-operated valve movable toward and from said seat to control the passage, one of said members including a compensating packing which maintains the passage closed during the initial opening movement of the valve, a valve-closing spring, and a motion-reducing connection between said valve and spring permitting a relatively large valve movement in relation to the variation of spring tension.

8. In a valve structure, the combination of a fluid receptacle having an outlet, an automatic relief-valve controlling said outlet, a valve-seating spring, and a compensator between said valve and spring whose point of connection with the latter moves in a path transverse to the direction of pressure of the spring.

9. In a valve structure, the combination of a fluid receptacle having an outlet, an automatic relief-valve controlling said outlet, a helical pull-spring for seating said valve, and a lever fulcrumed on a fixed support and connected with the valve, said spring being attached to said lever at a motion-reducing point which travels on an arc transverse to the direction of pull of the spring.

10. In valve apparatus, the combination of a fluid receptacle having an opening, an automatic valve controlling said opening, a lever having a substantially radial long arm fulcrumed at one end and pivotally connected with the valve at the other end and a short arm at an acute angle to the axis of movement of the valve, and a valve-seating spring attached to said short arm and pressing thereon in the general direction of movement of the valve.

11. In valve apparatus, the combination of a valve frame having a fluid passage and a transverse valve-seat surrounding said passage, a disk-type valve movable toward and from said seat, a series of levers having radial long arms fulcrumed to said frame at their inner ends and linked to the valve at their outer ends, and short arms extending toward the valve at acute angles to the axis of motion of the latter, and a series of pull springs extending longitudinally of the direction of movement of the valve, said springs being fixed at one end and having their other ends attached to the short arms of the respective levers and movable thereby in transverse paths toward the axis of the valve during the latter's opening movement.

12. In valve apparatus, the combination with a fluid-pressure receptacle, of an automatic relief valve therefor, a valve-seating spring within the receptacle, and means operable from outside the receptacle for varying the tension of said spring.

13. In valve apparatus, the combination with a fluid-pressure receptacle, of a frame having a valve-seat and an interior valve-stem guide, a disk-type valve co-acting with said seat and having a stem in said guide, a spring-adjusting screw sleeve surrounding the guide and held from rotation thereon, a nut engaging the screw and held against axial movement on said guide, a shaft extending to an exterior point on the frame, and gearing connecting said shaft and nut, whereby the rotation of the shaft turns the nut and slides the screw axially on the guide.

14. In valve apparatus, the combination with a fluid-pressure receptacle, of a frame having a valve-seat, an interior valve-seating spring, a spring-adjuster, a telescopic shaft for operating said adjuster, including a shaft-section which is journaled in a bearing on the frame adjacent to said valve-seat and has an exterior head abutting against the outer end of the journal bearing, an annular packing member surrounding said shaft-section at the inner end of the journal bearing, and a spring pressing axially inward on said shaft-section and axially outward on said packing member.

In testimony whereof I have hereunto set my hand this 4 day of February 1918.

JOHN R. GAMMETER.